(12) United States Patent
Choi

(10) Patent No.: US 11,573,824 B2
(45) Date of Patent: Feb. 7, 2023

(54) DATA STORAGE DEVICE AND OPERATING METHOD THEREOF

(71) Applicant: SK hynix Inc., Icheon (KR)

(72) Inventor: Jung Min Choi, Icheon (KR)

(73) Assignee: SK hynix Inc., Icheon (KR)

( * ) Notice: Subject to any disclaimer, the term of this patent is extended or adjusted under 35 U.S.C. 154(b) by 309 days.

(21) Appl. No.: 16/852,228

(22) Filed: Apr. 17, 2020

(65) Prior Publication Data

US 2021/0132988 A1    May 6, 2021

(30) Foreign Application Priority Data

Oct. 31, 2019   (KR) .................. 10-2019-0137342

(51) Int. Cl.
*G06F 9/48* (2006.01)
*G06F 9/50* (2006.01)
*G06F 3/06* (2006.01)

(52) U.S. Cl.
CPC ............ *G06F 9/4881* (2013.01); *G06F 3/061* (2013.01); *G06F 3/0656* (2013.01); *G06F 3/0659* (2013.01); *G06F 3/0673* (2013.01); *G06F 9/4818* (2013.01); *G06F 9/5038* (2013.01)

(58) Field of Classification Search
CPC ...... G06F 9/4881; G06F 3/061; G06F 3/0656; G06F 3/0659; G06F 3/0673; G06F 9/4818; G06F 9/5038; G06F 3/0679; G06F 3/0688; G06F 9/4812; G06F 9/546; G06F 2209/5021; G06F 2209/548; G06F 13/1642; G06F 13/1668; G06F 13/26
See application file for complete search history.

(56) References Cited

U.S. PATENT DOCUMENTS

| 2005/0050395 A1* | 3/2005 | Kissell ................. G06F 9/4843 712/E9.032 |
| 2007/0143516 A1* | 6/2007 | Sato ........................ G06F 13/26 710/264 |
| 2020/0301600 A1* | 9/2020 | Hu .......................... G06Q 10/10 |

FOREIGN PATENT DOCUMENTS

| KR | 1020070056945 A | 6/2007 |
| KR | 101392934 B1 | 4/2014 |

* cited by examiner

*Primary Examiner* — Zhuo H Li

(57) ABSTRACT

A data storage device includes a shared command queue, a queue controller, a processor, and a memory. The command queue is configured to queue a plurality of jobs transmitted from a plurality of host processors. The queue controller is configured to classify the plurality of jobs into a plurality of levels of jobs according to priority threshold values and assign jobs of the plurality of levels of jobs the processor. The processor is configured to process the jobs assigned by the queue controller. The memory may store data needed to process the job.

14 Claims, 8 Drawing Sheets

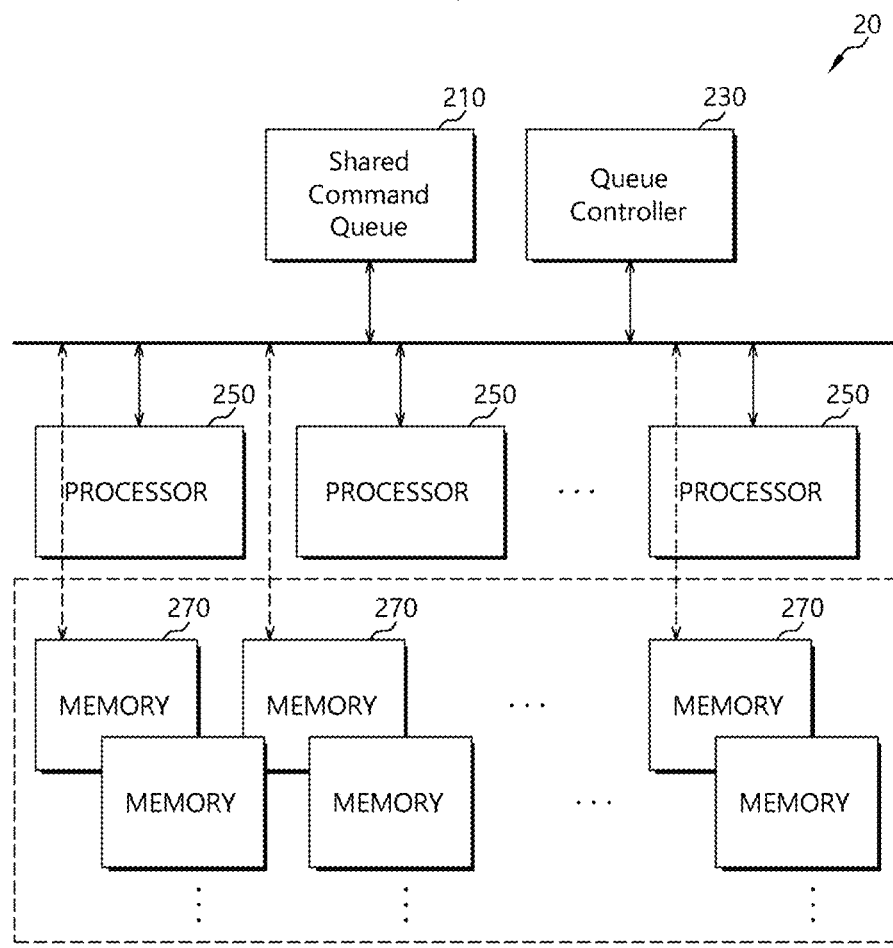

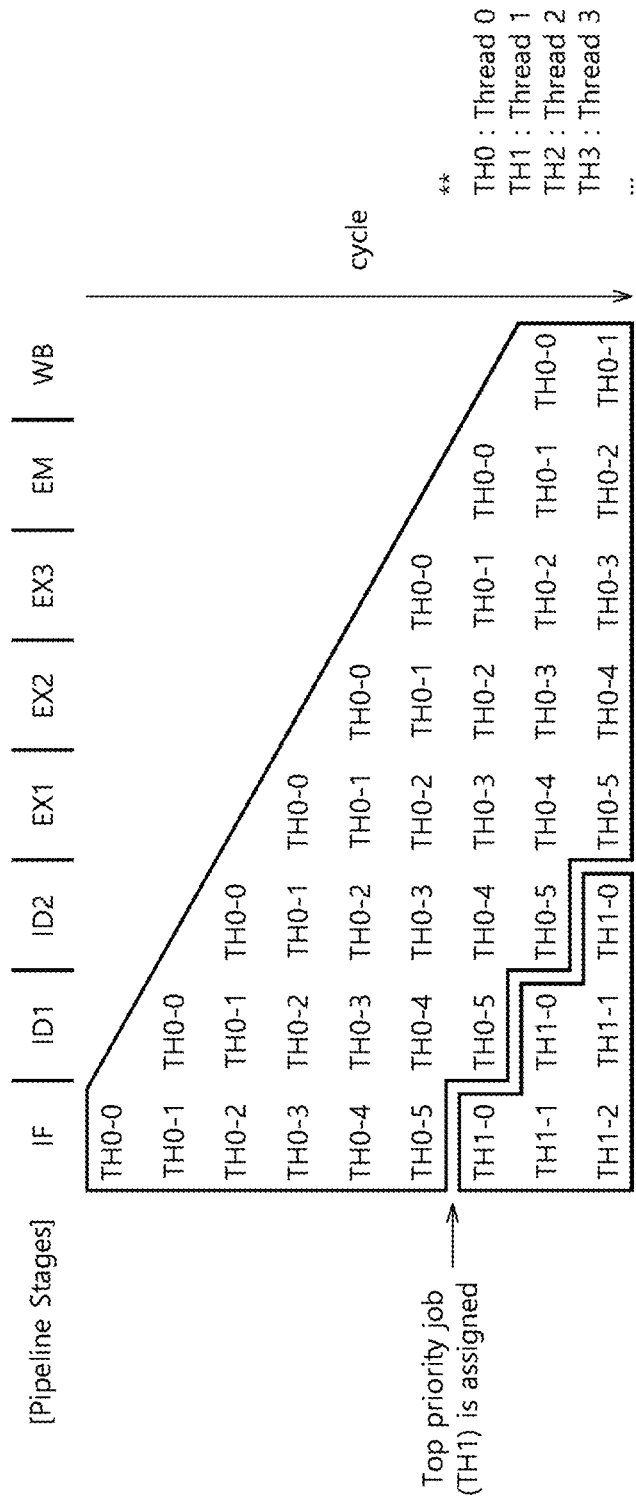

DATA STORAGE DEVICE AND OPERATING METHOD THEREOF

CROSS-REFERENCE TO RELATED APPLICATION

The present application claims priority under 35 U.S.C. § 119(a) to Korean application number 10-2019-0137342, filed on Oct. 31, 2019, in the Korean Intellectual Property Office, which is incorporated herein by reference in its entirety.

BACKGROUND

1. Technical Field

Various embodiments generally relate to a semiconductor device, and more particularly, to a data storage device and an operating method thereof.

2. Related Art

In general, a data storage system may have a volatile and byte-accessible memory structure (for example a dynamic random access (DRAM) memory structure) or a nonvolatile block storage structure (for example, a solid state drive (SSD) or hard disc drive (HDD) structure). An access rate of an SSD or HDD may be several tens to tens of thousands of times slower than an access rate of a DRAM.

Currently, storage class memory (SCM) devices are in use which have the nonvolatile characteristics of a flash memory, support high-speed write and read at speeds typically found in DRAM, and are accessible in byte units.

Near pooled memory processing (NPP) handles often data-intensive operations in near-pool processor(s) closely coupled to pooled memory. The main purpose of NPP is to promote resource saving by minimizing data movement between a host and a storage media storing data to be processed for the host.

NPP may provide enhanced memory capacity through utilization of a memory pool in a disaggregated architecture. Accordingly, an NPP system may receive various jobs off-loaded from a plurality of hosts. Priorities for the various off-loaded jobs may be different and deadlines for an off-loaded jobs to respond with a processing result to the host (i.e., response deadlines) may also be different.

The jobs may be sequentially processed according to which has the highest priority, but is some cases starvation for a low priority job may occur as a result. Further, the response deadline of the high priority job may not also be met due to processing delay of a job that is already being processed.

SUMMARY

Embodiments provide a data storage device which efficiently processes various jobs and an operating method thereof.

In an embodiment of the present disclosure, a data storage device may include: a shared command queue configured to queue a plurality of jobs transmitted from a plurality of host processors; a queue controller configured to classify the plurality of jobs into a plurality of levels of jobs including a first priority job, a second priority job, and a third priority job according to priority threshold values and assign one or more jobs of the plurality of levels of jobs to a processor; the processor configured to process the jobs assigned by the queue controller; and a memory, wherein the queue controller controls the jobs to be processed according to a priority corresponding to the plurality of levels by generating a set interrupt to the processor according to the priority when assigning the one or more jobs, and when an assigned job is classified as the first priority job, the processor performs context switching on the assigned job in a blocked multi-threading (BMT) scheme without termination of a job which is already being processed by the processor, according to the set interrupt.

In an embodiment of the present disclosure, an operating method of a data storage device may include: queuing a plurality of jobs transmitted from a plurality of host processors; listing the plurality of jobs according to a priority scheduling criterion; classifying the plurality of listed jobs into a plurality of levels of jobs based on priority threshold values; assigning jobs of the plurality of levels of jobs to a processor; and processing the jobs according to a priority using the processor.

According to an embodiment of the present disclosure, job balancing may be maintained by processing queued various jobs in order determined according to a criterion including a priority and a dead line and thus and performance of a data storage device can be improved.

These and other features, aspects, and embodiments are described in more detail below.

BRIEF DESCRIPTION OF THE DRAWINGS

The above and other aspects, features, and advantages of the subject matter of the present disclosure will be more clearly understood from the following detailed description taken in conjunction with the accompanying drawings, in which:

FIG. 2 illustrates a data storage device according to an embodiment of the present disclosure;

FIG. 3 illustrates a plurality of jobs according to an embodiment of the present disclosure;

FIGS. 4, 5, and 6 illustrate a process of processing jobs according to a priority according to an embodiment of the present disclosure;

DETAILED DESCRIPTION

Various embodiments of the present invention are described in greater detail below with reference to the accompanying drawings. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment" or the like is not necessarily to only one embodiment, and different references to any such phrase are not necessarily to the same embodiment(s).

It will be understood that when an element or layer is referred to as being "on," "connected to" or "coupled with" another element or layer, it can be directly on, connected or coupled with the other element or layer or one or more intervening elements or layers may be present. It will be further understood that the terms "comprises" and/or "comprising," when used in this specification, do not preclude the existence or addition of other non-stated elements. Similarly, the indefinite articles "a" and "an" indicate one or more, unless stated or the context clearly indicates only one.

Figure 1:
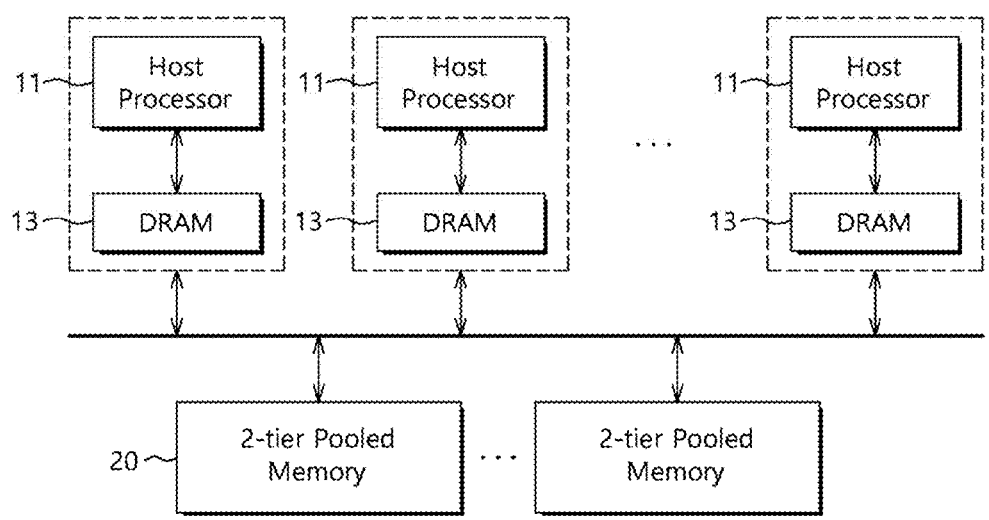
FIG. 1 illustrates a data storage system according to an embodiment of the present disclosure.

FIG. 1 illustrates a data storage system 10 according to an embodiment and FIG. 2 illustrates a data storage device 20 according to an embodiment.

Figure 5:
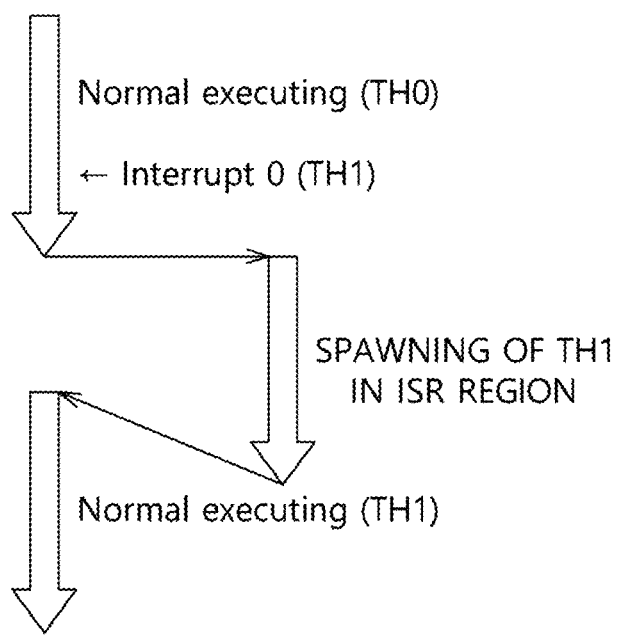
Figure 6:
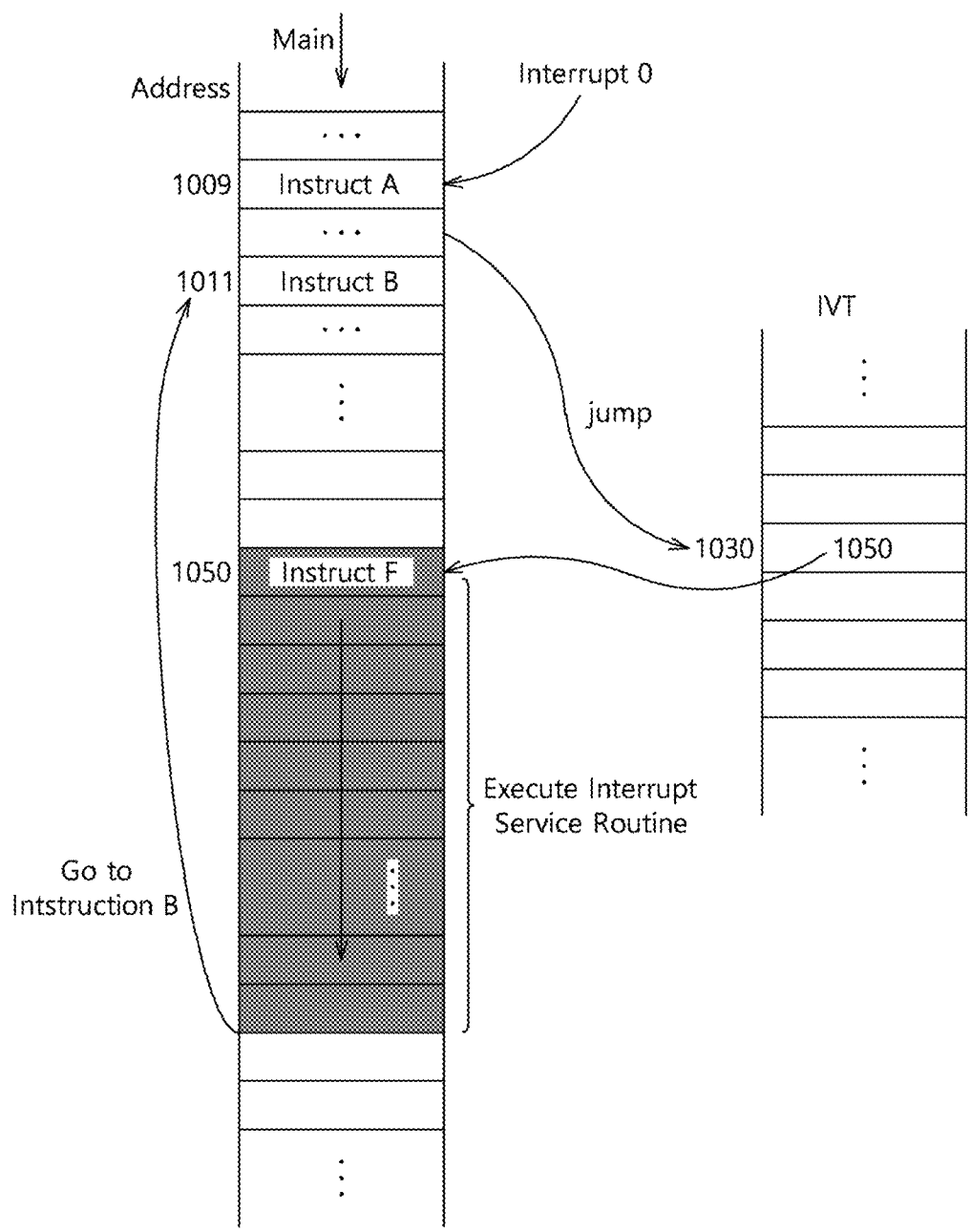
Figure 7:
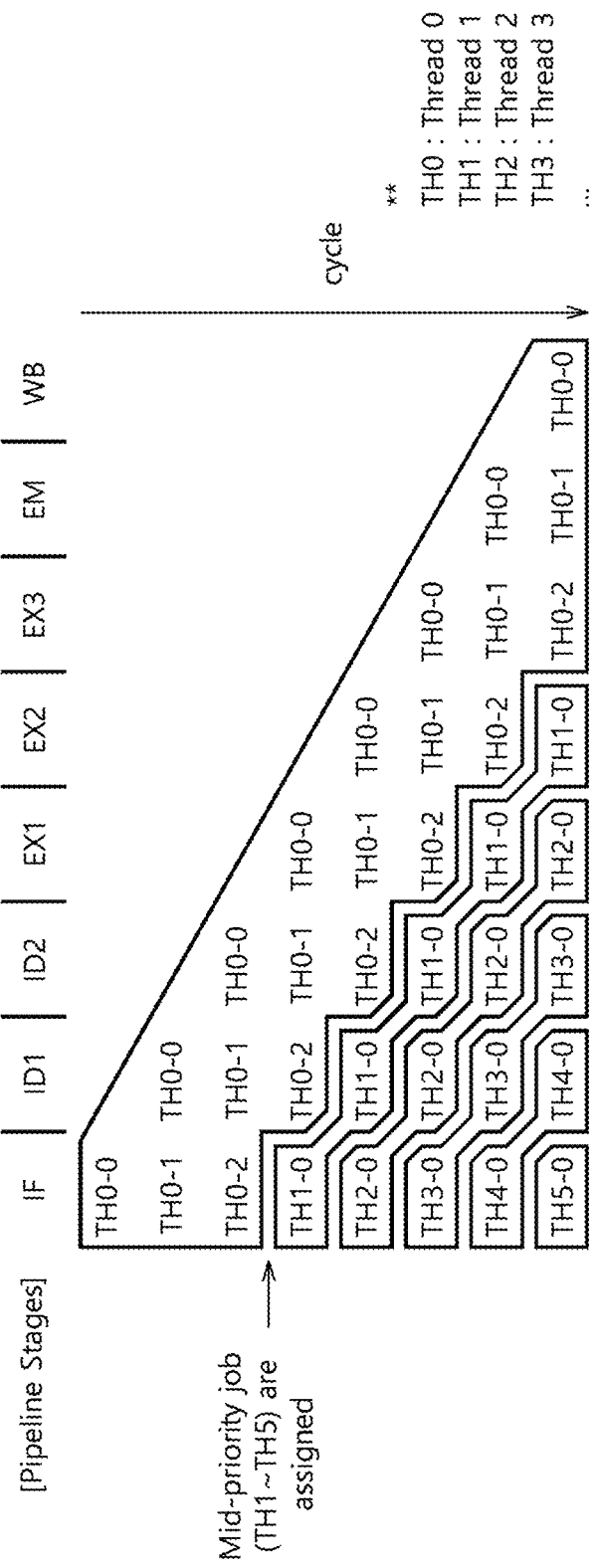
FIG. 7 illustrates a process of processing jobs according to a priority according to another embodiment of the present disclosure.

FIG. 3 illustrates a plurality of levels of jobs according to an embodiment, FIGS. 4 to 6 illustrate a process of processing jobs according to a priority according to an embodiment, and FIG. 7 illustrate a process of processing jobs according to a priority according to another embodiment. Hereinafter, a data storage system including a data storage device will be described with reference to the figures.

Referring to FIG. 1, the data storage system 10 according to an embodiment may include one or more host processors 11 and one or more data storage devices 20 configured to process a job transferred from the host processors 11. Each host processor 11 may be coupled to a respective DRAM 13 configured to store information related to that host processor 11. As illustrated in FIG. 1, a plurality of sets, each comprising a host processor 11 and a DRAM 13, may be provided. The host processor 11 may include at least one among a central processing unit (CPU), an image signal processing unit (ISP), a digital signal processing unit (DSP), a graphics processing unit (GPU), a vision processing unit (VPU), a field programmable gate array (FPGA), and a neural processing unit (NPU). The data storage device 20 may be implemented using a plurality of 2-tier pooled memories, and may comprise a near memory pool processing (NPP) system.

Referring to FIG. 2, the data storage device 20 may include a shared command queue 210, a queue controller 230, one or more processors 250, and one or more memories 270. Each processor 250 may be a near pooled memory processor (NP processor) and each memory 270 may be a storage class memory (SCM).

The shared command queue 210 may queue a plurality of jobs transferred from a plurality of host processors 11. When the processor 250 is an NP processor, the shared command queue 210 may ensure enhanced memory capacity by using a plurality of memories 270 in a memory pool configured in a disaggregated architecture. The shared command queue 210 may receive the plurality of jobs respectively having various priorities and response deadlines from the plurality of host processors 11.

The queue controller 230 may classify each job of the plurality of jobs into one of a plurality of levels of jobs according to priority threshold values and assign jobs from the plurality of levels of jobs to a processor 250.

For example, the queue controller 230 may list the plurality of jobs according to a priority scheduling criterion and classify the plurality of listed jobs into the plurality of levels of jobs based on the priority threshold values. The priority scheduling criterion may include at least one among time limit information of a job (such as a response deadline of the job), memory capacity required for the job, a input/output (I/O) rate, a CPU rate, a process importance, and a cost of a resource.

Referring to FIG. 3, the queue controller 230 may sequence a plurality of jobs including instructions for performing the jobs according to the priority scheduling criterion and classify the plurality of jobs into a plurality of levels of jobs TH0, TH1, TH2, and the like based on priority threshold values Thread 0, Thread 1, Thread 2, and the like. The TH0 job may include instructions TH0-0, TH0-1, TH0-2, and so on, the TH1 job may include instructions TH1-0, TH1-1, TH1-2, and so on, and the TH2 job may include instructions TH2-0, TH2-1, TH2-2, and so on.

The queue controller 230 may classify the plurality of jobs into a plurality of levels of jobs including a first priority job, a second priority job, and a third priority job according to the priority threshold values. The first priority job may have a priority higher than the second priority job and the second priority job may have a priority higher than the third priority job.

For example, in FIG. 4 the TH1 job may be a first priority job and in FIG. 7 the TH1, TH2, TH3, TH4, and TH5 jobs may be second priority jobs.

Further, when assigning the jobs, the queue controller 230 may control the processor 250 to process the jobs according to the priority corresponding to the plurality of levels by generating a set interrupt to the processor 250 according to the priority. The interrupt may be previously configured, between the queue controller 230 and the processor 250 and between the queue controller 230 and the memory 270, to terminate a normal operation which is currently being processed, and to process the jobs assigned to the processor 250 according to the priority. Identification information of the interrupts associated with the first priority job, the second priority job, and the third priority job may be different from each other. For example, an interrupt interrupt 0 may refer to an interrupt for processing the first priority job and an interrupt interrupt 1 may refer to an interrupt for processing the second priority job.

Referring to FIG. 4, when the TH1 job which is the first priority job (Top priority job) is assigned while the processor 250, using an instruction execution pipeline, processes the TH0 job using instructions TH0-0, TH0-1, TH0-2, TH0-3, TH0-4, and TH0-5 corresponding to the TH0 job, the queue controller 230 may simultaneously transfer the TH1 job and assert the interrupt interrupt 0 to the processor 250, which is previously set between the processor 250 and the queue controller 230, to signal the processor 250 to preferentially process the TH1 job.

In FIG. 4, IF may refer to Instruction Fetch, ID may refer to Instruction Decode/Register Fetch, EX may refer to Instruction Execution, EM may refer to Memory Access, and WB may refer to Register Write Back. Accordingly, FIG. 4 illustrates a pipeline with an Instruction Fetch stage (IF), first and second Instruction Decode/Register Fetch stages (ID1 and ID2), first, second, and third Instruction Execution stages (EX1, EX2, and EX3), a Memory Access stage (EM), and a Register Write Back stage (WB). Instructions from a normal job TH0 and a first priority job TH1 are fetched and executed by the pipeline. In the first through sixth cycles, instructions TH0-0, TH0-1, TH0-2, TH0-3, TH0-4, and TH0-5 are respectively fetched, and after being fetched each progresses down the pipeline by one stage in each new cycle. After the sixth cycle, an interrupt occurs, which may halt the fetching of additional instructions from thread TH0. Instead, the processor 250 switches to fetching and executing instructions TH1-0, TH1-1, TH1-2, and so on of the first priority job TH1.

When the time that has elapsed since a job that is a third priority job was received by the command queue 210 exceeds a reference value, the queue controller 230 may change the job to be a second priority job (that is, the queue controller 230 reclassifies the job as a second priority job) and assign the job to the processor 250. Although not shown, the data storage device 20 or the queue command 230 may further include a timer used to check the job-queued time. By this mechanism, an embodiment prevents starvation of low-priority jobs by changing the third (low) priority job to the second (middle) priority job after a certain time.

When assigning the job to the processor 250, the queue controller 230 may select a processor 250, to which the job is to be assigned, among a plurality of processors 250 by considering at least one among CPU utilization, throughput, a turnaround time, a waiting time, and a response time of each of the processors.

Namely, the queue controller 230 assigns the jobs by considering states of the processors 250 to process the jobs more efficiently and quickly.

When each of the processors 250 is coupled not to all the memories 270 but to a particular memory 270 among the memories 270, and that particular memory 270 needs to be accessed to process a specific job queued to the share command queue 210, the queue controller 230 may assign that specific job to the processor 250 coupled to that particular memory 270.

As described above, each of the plurality of processors 250 may be implemented in a structure in which each processor 250 is coupled to all the memories 270 and shares all the memories 270 or in a structure in which each processor 250 is respectively coupled only to some of the memories 270.

The processor 250 may process the job transmitted from the queue controller 230.

The processor 250 may not terminate a job which is being processed and may instead perform context switching on the first priority job in a blocked multithreading (BMT) scheme, according to the set interrupt. The BMT scheme means that a normal job (that is, the job being processed by the processor 250 when the interrupt is received) is switched to a specific job when an interrupt for processing the corresponding specific job occurs while the processor 250 is processing the normal job.

Referring to FIG. 4, when the TH1 job, which is the first priority job (Top priority job), is assigned to processor 250 while the processor 250 is processing the TH0 job by executing instructions TH-0, TH0-1, TH0-2, TH0-3, TH0-4, and TH0-5 according to the instruction pipeline, the processor 250 may stop the processing of the TH0 job without termination of the TH0 job and may preferentially process the TH1 job.

Specifically, referring to FIG. 5, when the TH1 job is associated with the interrupt interrupt 0, which is previously assigned to preferentially process a specific job, while processing the normal job TH0, the processor 250 may not terminate the currently-executing TH0 job but may stop (at least temporarily) fetching any more instructions of the currently-executing TH0 job, may allow the instructions corresponding to the TH0 job that are already in the pipeline to complete, and may preferentially process the TH1 job including instructions TH1-0, TH1-1, and TH1-2. To preferentially perform the TH1 job, the processor 250 may stop the processing of further instructions of the TH0 job and perform spawning on the TH1 job in an interrupt service routine (ISR) region. The spawning of the TH1 job may include execution of an instruction for the TH1 job.

Then, the processor 250 may perform another normal job again when the processing of the TH1 job is completed. For example, performing another normal job may include resuming the TH0 job or starting or resuming a different normal job when the TH0 job has been previously completed.

Referring to FIG. 6, when the TH1 job is assigned by means of the interrupt interrupt 0 previously allocated with the queue controller 230 for processing by the processor 250 while the processor 250 is in normal operation of processing an instruction Instruct A at an address 1009, the processor 250 may jump to an address 1030 of an interrupt vector table (IVT) to determine a location for processing an interrupt service routine (ISR), jump to the corresponding ISR region, perform spawning on the TH1 job, and directly terminate the spawning operation. Then, the processor 250 may resume normal operation to perform the TH1 job by executing one or more TH1 instructions (for example, Instruction F and the instructions following it).

When the processor 250 completes executing the one or more TH1 instructions, the processor 250 may continue normal operation by performing an instruction Instruct B that follows instruction Instruct A.

The processor 250 may define interrupts between the queue controller 230 and the processor 250 and between the queue controller 230 and the memory 270 in advance, such as setting interrupt 1 for initiating processing of second priority jobs in addition to setting interrupt 0 for initiating processing of first priority jobs.

The processor 250 may access one or more memory 270 configured to store related data required to process the job when processing the job.

The processor 250 may perform context switching on second priority jobs using an interleaved multithreading (IMT) scheme according to the set interrupt. The IMT scheme means that the processor 250 processes two or more jobs at once and switches from issuing instructions for any one job to issuing instructions for another job every clock cycle.

Referring to FIG. 7, when the TH1, TH2, TH3, TH4, and TH5 jobs, which are second priority jobs (Mid-priority jobs), are assigned to a processor 250 while that processor is processing the TH0 job including instructions TH0-0, TH0-1, and TH0-2 according to the instruction pipeline, the processor 250 may not terminate the TH0 job but may stop the processing of additional (not yet fetched) instructions of the TH0 job and then may preferentially process the TH1, TH2, TH3, TH4, and TH5 jobs. The processor 250 may produce a response to processing of a plurality of second priority jobs by applying the IMT scheme which stops the processing of the currently-executing TH0 job and then sequentially processes the plurality of second priority jobs, which is unlike the processing scheme of a first priority job described with respect to FIG. 4.

For example, when the processor 250 stops the processing of the TH0 job including the instructions TH0-0, TH0-1, and TH0-2 and processes the second priority jobs, the processor 250 processes the second priority jobs TH1 to TH5 in order of instructions TH1-0, TH2-0, TH3-0, TH4-0, and TH5-0, followed by instructions TH1-1, TH2-1, TH3-1, TH4-1, and TH5-1, and so on. The processing method of the second priority jobs is different from the processing method which processes the first priority job TH1 in order of instructions TH1-0, TH1-1, and TH1-2 included in the TH1 job.

Although not shown, when the second priority jobs TH1, TH2, TH3, TH4, and TH5 together with the interrupt 1, which is previously allocated to indicating that the processor 250 is to preferentially process the second priority jobs rather than the normal job TH0, are assigned to the processor 250 while the processor 250 is processing the normal job TH0, the processor 250 may stop the processing of the TH0 job without termination of the currently-executing normal TH0 job and preferentially process the second priority jobs TH1, TH2, TH3, TH4, and TH5. Then, when the processing of the TH1, TH2, TH3, TH4, and TH5 jobs is completed, the processor 250 may process the normal job again. At this time, the processor 250 may not complete one job of the second priority jobs and then switch to another job of the second priority jobs but perform the second priority jobs in parallel.

Figure 8:
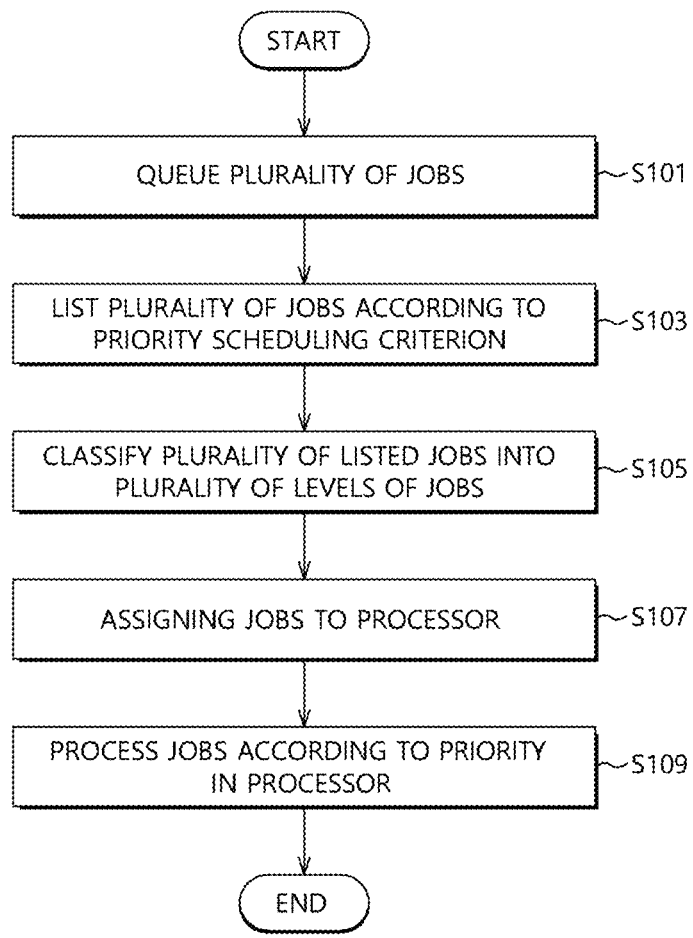
FIG. 8 is a flowchart of an operating process of a data storage device according to an embodiment of the present disclosure.

FIG. 8 is a flowchart explaining an operating method of a data storage device according to an embodiment.

First, the shared command queue 210 may queue a plurality of jobs transmitted from a plurality of host processors 11 (S101). The plurality of jobs may have priorities and response deadlines different from each other.

The queue controller 230 may list the plurality of jobs in an order according to the priority scheduling criterion (S103). The priority scheduling criterion may include at least one among time limit information of a job including a response deadline of the job, memory capacity required for the job, an input/output (I/O) rate, a CPU rate, a process importance, and a cost of a resource specified by the job. Referring to FIG. 3, the data storage device 20 may list, based on the priority scheduling criterion, the plurality of jobs TH0, TH1, TH2, and the like including the instructions TH0-0, TH0-1, TH0-2, ..., TH1-0, TH1-1, TH1-2, ..., and TH2-0, TH2-1, TH2-2, ..., according to the priority. More specifically, the queue controller 230 may list the instructions included in the plurality of jobs according to the priority.

The queue controller 230 may classify the plurality of listed jobs into the plurality of levels of jobs based on the priority threshold values (S105).

The queue controller 230 may classify the plurality of jobs into the plurality of levels of jobs (TH0, TH1, TH2, and the like) based on priority threshold values Thread 0, Thread 1, Thread 2, and the like. The TH0 job may include the instructions TH0-0, TH0-1, TH0-2, and the like, the TH1 job may include the instructions TH1-0, TH1-1, TH1-2, and the like, and the TH2 job may include the instructions TH2-0, TH2-1, TH2-2, and the like.

The queue controller 230 may classify the plurality of jobs into a plurality of levels of jobs including a first priority job, a second priority job, and a third priority job according to the priority threshold values. The first priority job may have a priority higher than the second priority job and the second priority job may have a priority higher than the third priority job.

The queue controller 230 may assign one or more jobs of the plurality of levels of jobs to the processor 250 (S107).

In a case where a plurality of processors 250 are provided, when assigning a job to any one of the plurality of processors 250, the queue controller 230 may select the one processor 250 to which the job is to be assigned from among the plurality of processors 250 by considering at least one among CPU utilization, throughput, a turnaround time, a waiting time, and a response time of each processor. Furthermore, the queue controller 230 may select the one processor 250 to which the job is to be assigned according to whether or how closely the processor 250 is connected to a memory 270 that includes data needed to process the job.

When assigning the job, the queue controller 230 may generate a set interrupt to the processor 250 according to the priority corresponding to the plurality of levels. For example, when a first priority job is assigned to the processor 250, the queue controller 230 may generate a first interrupt to the processor 250, when a second priority job is assigned to the processor 250, the queue controller 230 may generate a second interrupt to the processor 250, and so on.

Although not shown, when the time that has elapsed since a job that is classified as a third priority job was received by the command queue 210 exceeds a reference value, the queue controller 230 may reclassify the job to as a second priority job and accordingly assign the job to the processor 250.

The processor 250 may process the jobs according to the priority (S109). The processor 250 may process the jobs based on the interrupt according to the priority.

Figure 9:
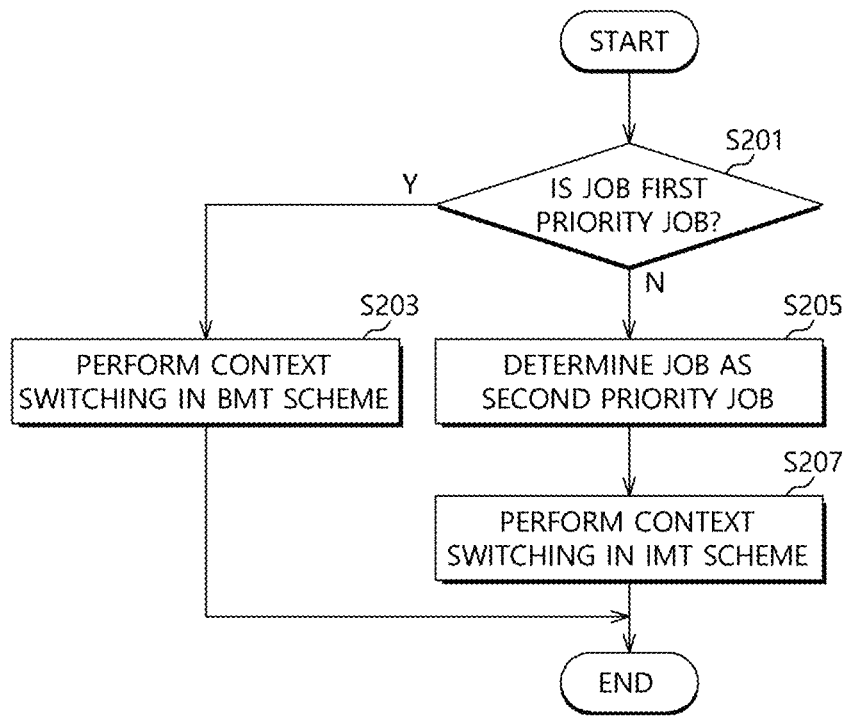
FIG. 9 is a flow chart explaining an operating process of processing a job of FIG. 8 according to an embodiment.

FIG. 9 is a flowchart showing details of the operation of processing the jobs in operation S109 of FIG. 8, according to an embodiment.

First, the processor 250 may determine whether or not the job assigned from the queue controller 230 is the first priority job (S201). The processor 250 may determine the priority of the job based on an interrupt transmitted from the queue controller 230 together with the job.

When it is determined in operation S201 that the assigned job is the first priority job, the processor 250 may not terminate a job which is currently being processed by the processor 250 and may perform context switching to the first priority job in a blocked multithreading (BMT) scheme, according to the set interrupt (S203). The BMT scheme means that execution is switched from a normal job to a specific job when an interrupt for processing the specific job occurs while processing the normal job.

Referring to FIG. 4, the TH1 job which is the first priority job (Top priority job) is assigned to a processor 250 while the processor 250 is processing the TH0 job by executing instructions TH0-0, TH0-1, TH0-2, TH0-3, TH0-4, and TH0-5 according to an instruction pipeline of the processor 250. In response, the processor 250 does not terminate the TH0 job, and instead may suspend the issue of further instructions from the TH0 job and may preferentially process the TH1 job.

Specifically, referring to FIG. 5, when the TH1 job is assigned as indicated by an interrupt interrupt 0 which is previously allocated to preferentially processing of a specific job while processing the normal job TH0, the processor 250 may stop the processing of the TH0 job without termination of the TH0 job and may preferentially process the TH1 job including the instructions TH1-0, TH1-1, TH1-2, and the like. To preferentially perform the TH1 job, the processor 250 may stop the processing of the TH0 job and perform spawning on the TH1 job in an Interrupt Service Routine (ISR) region. The spawning of the TH1 job may include generating an instruction for the TH1 job.

Then, when the processing of the TH1 job is completed, the processor 250 may perform a normal job again, which may be the TH0 job or another normal job when the TH0 has been previously completed.

Referring to FIG. 6, when the TH1 job is assigned and the interrupt interrupt 0 previously allocated with the queue controller 230 while processing a job including the instruction Instruct A in an address 1009, the processor 250 may, in response to the interrupt interrupt 0, jump to an address 1030 of an interrupt vector table (IVT), determine a location for processing an interrupt service routine (ISR), jump to the corresponding ISR region, perform spawning of the TH1 job, and then terminate the spawning. Then, the processor 250 may return to normal operation and perform the TH1 job by executing instructions of the TH1 job (in the example, instruction Instruct F and the instructions that follow it). When the processing of the instructions of the TH1 job is completed, the processor 250 may perform a normal operation corresponding to an instruction Instruct B, wherein the instruction Instruct B may correspond to a next instruction in the job that includes the instruction Instruct A.

When it is determined in operation S201 that the assigned job is not the first priority job, the assigned job is determined to be the second priority job (S205), and the processor 250 may perform context switching on the second priority job in an interleaved multithreading (IMT) scheme according to the set interrupt (S207), as described with respect to FIG. 7.

The above described embodiments of the present invention are intended to illustrate, not limit the present invention. Various alternatives and equivalents are possible, as those skilled in the art will appreciate in light of the present disclosure. The invention is not limited by or to any of the embodiments described herein. Nor is the invention limited to any specific type of semiconductor device. Rather, the present invention encompasses all variations and modifications that fall within the scope of the appended claims.

What is claimed is:

1. A data storage device comprising:
a shared command queue configured to queue a plurality of jobs transmitted from a plurality of host processors;
a queue controller configured to list the plurality of jobs according to a priority scheduling criterion, classify the plurality of listed jobs into a plurality of levels of jobs including a first priority job, a second priority job, and a third priority job according to priority threshold values and assign one or more jobs of the plurality of levels of jobs to a processor;
the processor configured to process the jobs assigned by the queue controller; and
a memory,
wherein the queue controller controls the jobs to be processed according to a priority corresponding to the plurality of levels by generating a set interrupt to the processor according to the priority when assigning the one or more jobs,
when an assigned job is classified as the first priority job, the processor performs context switching on the assigned job in a blocked multithreading (BMT) scheme without termination of a job which is already being processed by the processor, according to the set interrupt, and
wherein the priority scheduling criterion includes at least one among time limit information of the job, a required memory capacity, an input/output (I/O) rate, a central processing unit (CPU) rate, a process importance, and a cost of a resource.

2. The data storage device of claim 1, wherein when the assigned job is classified as the second priority job, the processor performs context switching on the assigned job in an interleaved multithreading (IMT) scheme according to the set interrupt.

3. The data storage device of claim 1, wherein when the time that has elapsed since a job classified as the third priority job was received exceeds a reference value, the queue controller reclassifies the job classified as the third priority job as the second priority job and assigns the reclassified job to the processor.

4. The data storage device of claim 1, wherein the first priority job has a priority higher than the second priority job and the second priority job has a priority higher than the third priority job.

5. The data storage device of claim 1, wherein the memory is a storage class memory (SCM).

6. A data storage device comprising:
a shared command queue configured to queue a plurality of jobs transmitted from a plurality of host processors;
a queue controller configured to classify the plurality of jobs into a plurality of levels of jobs including a first priority job, a second priority job, and a third priority job according to priority threshold values and assign one or more jobs of the plurality of levels of jobs to a processor;
the processor configured to process the jobs assigned by the queue controller; and
a memory,
wherein the queue controller controls the jobs to be processed according to a priority corresponding to the plurality of levels by generating a set interrupt to the processor according to the priority when assigning the one or more jobs,
when an assigned job is classified as the first priority job, the processor performs context switching on the assigned job in a blocked multithreading (BMT) scheme without termination of a job which is already being processed by the processor, according to the set interrupt,
wherein the data storage device includes a plurality of processors, the plurality of processors including the processor, and
wherein the queue controller assigns the job to the processor according to at least one among a central processing unit (CPU) utilization, a throughput, a turnaround time, a waiting time, and a response time of each of the plurality of processors.

7. An operating method of a data storage device, the method comprising:
queuing a plurality of jobs transmitted from a plurality of host processors;
listing the plurality of jobs according to a priority scheduling criterion;
classifying the plurality of listed jobs into a plurality of levels of jobs based on priority threshold values;
assigning jobs of the plurality of levels of jobs to a processor; and
processing the jobs according to a priority using the processor,
wherein the data storage device includes a plurality of processors, the plurality of processors including the processor, and
wherein assigning jobs of the plurality of levels of jobs to the processor includes selecting the processor according to at least one among a central processing unit (CPU) utilization, a throughput, a turnaround time, a waiting time, and a response time of each of the processors.

8. The method of claim 7, wherein assigning the jobs to the processor includes generating a set interrupt to the processor according to the priority corresponding to the plurality of levels.

9. The method of claim 8, wherein processing the jobs according to the priority includes processing the jobs based on the interrupt according to the priority.

10. The method of claim 8, wherein classifying the plurality of jobs into the plurality of levels of jobs includes respectively classifying jobs of the plurality of jobs into one of a first priority job, a second priority job, and a third priority job according to the priority threshold values.

11. The method of claim 10, wherein processing the jobs according to the priority includes performing context switching for a job classified as the first priority job in a blocked multithreading (BMT) scheme without termination of a job that was being processed, according to the set interrupt.

12. The method of claim 10, wherein the processing of the jobs according to the priority includes performing context switching for a job classified as a second priority job in an interleaved multithreading (IMT) scheme according to the set interrupt.

13. The method of claim 10, further comprising:
when a time since a job classified as the third priority job was received exceeds a reference value, reclassifying the job classified as the third priority job as the second priority job and assigning the reclassified job to the processor.

14. The method of claim 10, wherein the first priority job has a priority higher than the second priority job and the second priority job has a priority higher than the third priority job.

* * * * *